Jan. 27, 1959     E. S. DUNN     2,871,070
SELF-EQUALIZING THRUST DEVICE
Filed Oct. 25, 1955
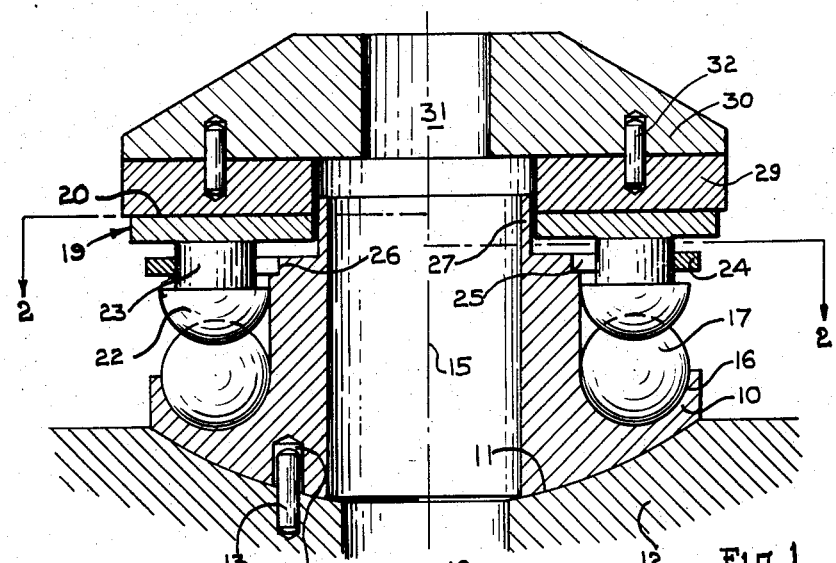
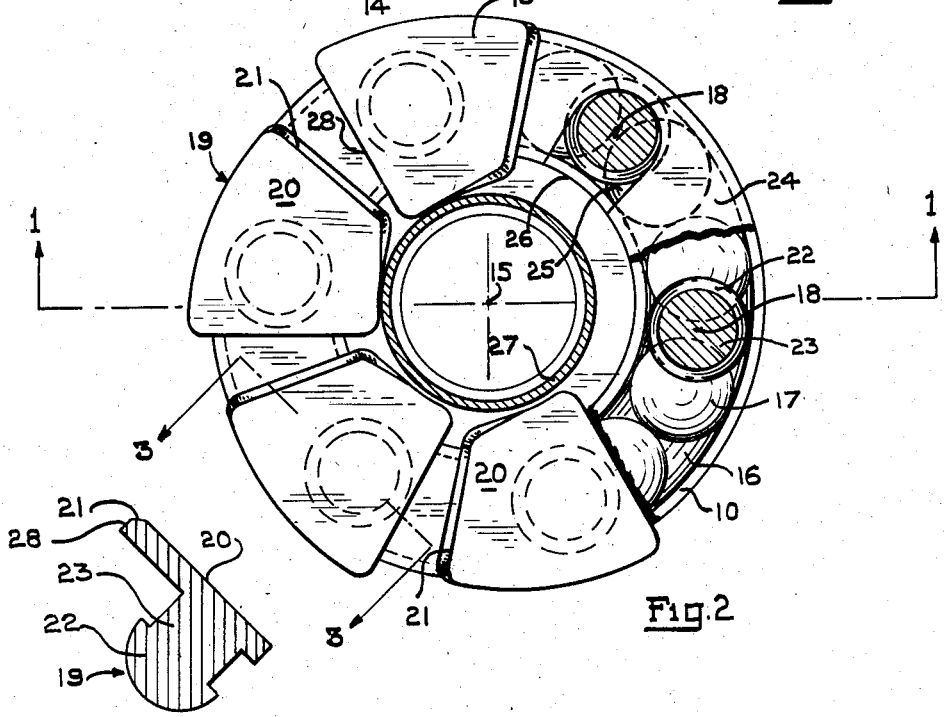
INVENTOR.
EUSTACE S. DUNN
BY
ATTORNEY.

United States Patent Office 2,871,070
Patented Jan. 27, 1959

2,871,070

SELF-EQUALIZING THRUST DEVICE

Eustace S. Dunn, Piedmont, Calif.

Application October 25, 1955, Serial No. 542,651

6 Claims. (Cl. 308—160)

This invention relates to improvements in devices which employ segmental elements whereby pressure is applied to a rotating plane surface. Examples of such devices are disc-type clutches for power transmission, disc-type brakes, Kingsbury-type thrust bearings, and the like.

Such devices consist basically of a rotating plane disc against which are pressed a plurality of segments or shoes mounted on a common base, which may be stationary or rotary, the contacting surfaces between the disc and the shoes being of such material as will produce more or less friction, depending on the purpose for which the device is to be used.

In such devices it is of great importance that the applied pressure should be distributed equally on all the shoes, so that each shoe can be dimensioned to sustain a high but safe relative load.

It is conventional procedure to mount the individual shoes on springs supported on a common base. This is not entirely satisfactory, since, in effect, the distribution of the total pressure on the individual spring-supported shoes is rarely even. A great many factors are involved in this connection, such as the length of the springs, the stiffness of the springs, the thickness of the shoes, and the rate of wear of the shoes, responsiveness of the assembly to temperature changes, manufacturing tolerances, perfect alignment, and numerous other factors.

It may suffice to consider, as an example, that one of the shoes wears more rapidly than the others. The more rapidly wearing shoe soon sustains less than its share of the load and an increased load results on the remaining shoes in the assembly.

In installations where high contact pressures must be sustained because of dimensional limitations, as for example in automobile clutches, in electromagnetic brakes on hoists and elevators, and in thrust bearings of pumps operating in boreholes, it is most important to provide for an even distribution of the thrust load in a more satisfactory manner than is attainable by individual spring mountings of the shoes.

The present invention provides a method of mounting the shoes so that they are self-equalizing, yet completely reliable and not subject to the difficulties and limitations to which the conventional method of spring supported shoes was subject.

According to the invention, the shoes are individually self-adjustable, yet the movement of the several shoes is so interrelated that an adjustment of one shoe affects the adjustment of the adjoining shoes. For example, depression of one shoe due to an increased load on that shoe is accompanied by an elevation of all the adjoining shoes which then tends to reduce the overload on the one shoe.

The various objects, features and advantages of the invention will appear more fully from the detailed description which follows, accompanied by drawings showing, for the purpose of illustration, a preferred embodiment of the invention. The invention also consists of certain new and original features of construction and combination of elements, as well as certain improvements in the design of the elements themselves, as will be set forth hereinafter and claimed.

Although the characteristic features of this invention, which are believed to be novel, will be particularly pointed out in the claims appended hereto, the invention itself, its objects and advantages and the manner in which it will be carried out may be better understood by referring to the following description taken in conjunction with the accompanying drawings forming a part of it, in which:

Figure 1 is a vertical section of a thrust bearing embodying the invention, the section being taken on the line 1—1 of Figure 2.

Figure 2 is a plan view, partly in broken section, of the assembly shown in Figure 1, the view being taken on the line 2—2 of Figure 1.

Figure 3 is a vertical section of an individual self-adjusting shoe element of the bearing assembly, the section being taken on the line 3—3 of Figure 2.

In the following description and in the claims various details will be identified by specific names for convenience. The names, however, are intended to be as generic in their application as the art will permit. Corresponding reference characters refer to corresponding parts in the several figures of the drawing.

In the drawings accompanying, and forming part of, this specification, certain specific disclosure of the invention is made for the purpose of explanation of broader aspects of the invention, but it is understood that the details may be modified in various respects without departure from the principles of the invention, and that the invention may be applied to other structures than the one shown, including those referred to herein.

The illustrated form shown in the drawing is of a bearing particularly suited for use in submersible pumps to sustain the weight of the rotor of the motor, the weight of the rotor of the turbine, and the thrust on the turbine rotor when the pump is in operation.

The bearing comprises a bearing base 10, the underside of which is preferably shaped to form a part of a sphere as at 11. This is supported on a sub-base 12 formed to the same spherical curvature as the bearing base 10 and provided with means to restrain the bearing base from rotating about the bearing axis 15. This restraint can be effected by one or more pins 13 inserted into holes of larger diameter 14. This arrangement insures that the bearing base is perfectly normal with respect to the bearing axis 15.

The bearing base 11 has an annular recess 16 formed therein in which movable elements of suitable shape and size are placed adjacent each other with freedom of adjustment and movement in the circular direction of the recess. Conveniently, standard bearing balls 17 may be used for this purpose although rollers, particularly tapered rollers will serve equally well, as is evident.

The arrangement of the movable elements is such that the elements may move along the track formed by the recess 16 with freedom of adjustment of the spacing between adjacent balls, and the size and number of elements is so selected that they do not quite touch one another, if they are evenly spaced. More particularly, in the illustrated use of balls, the diameter of the balls is such that there is no appreciable radial play and the sum of all the ball diameters is slightly less than the length of the circle through the points of contact of the balls, if the balls were pushed together.

The movable elements are arranged, as will later appear, so that there are twice as many elements 17 as there are bearing segments 19, and the movable elements are slightly spaced from one another as shown at 18. The bearing further comprises a plurality of bearing segments or shoes 19, there being as many shoes as there are groups of balls 17.

A particularly advantageous form of bearing shoe 19 is shown in the drawings and alone, in section, in Figure 3. It has a top surface 20 which is machined to give a smooth flat surface with a chamfered leading edge 21. The shape of the top contacting surface is substantially an irregular quadrilateral with the leading edge at a more acute angle to the radius of the bearing than the trailing edge. Its underside may be formed with or secured to a suitable pivot ball 22 by means of which the bearing shoe contacts and rests on the balls 17. More particularly, each bearing shoe rests between and is in contact with two of the balls positioned in the annular recess 16. The pivot ball 22 is suitably a part or the whole of a sphere joined to the upper part of the bearing shoe by a cylindrical neck 23. The drawings show the pivot ball as a hemisphere. The thrust load sustained by any individual bearing shoe tends to wedge the two balls on which it is resting, apart, thereby producing the space 18.

The bearing shoes are positioned by a retainer ring 24 having equidistant U-shaped apertures 25 opening toward the center, for engagement with the cylindrical neck 23 of the shoe 19. As shown in Figure 1, the apertures 25 extend radially outward to the extent that when the cylindrical neck 23 of the shoe 19 engages with the outermost surface of the aperture, the center of the pivot ball 22 is coincident with the centerline of the track 16. The width of the apertures 25 is greater than the diameter of the cylindrical neck 23, the difference being of the order of .030 of an inch. The apertures 25 being open ended will permit limited radial movement, and being wider than neck 23 will permit limited circumferential movement, while the dome head 19 contacting balls 17, will give limited universal movement.

The U-shaped apertures 25 in the retainer ring 24 open radially inwardly around its inner periphery. Into these openings the neck 23 of each shoe 19 enters and is placed in position so that when the retainer ring 24 is pressed onto the tubular extension at 26 the shoes are restrained from any but slight radially inward movement by interference between the pivot ball 22 and the inner edge of the track 16. The cylindrical neck 23 is smaller in diameter than the pivot ball 22, the difference being of the order of .075 of an inch, so that when the cylindrical neck has entered the aperture 25 its vertically upward axial movement is restrained by the pivot ball 22 being stopped at the under surface of retainer ring 24. However, there is sufficient movement to permit required vertical adjustment of the bearing shoes. The length of the cylindrical neck 23 relative to the thickness of the retainer ring 24 is such as to allow the bearing surface a minimum tilt in any direction of the order of 7 degrees about the center of rotation of the pivot ball 22 when the pivot ball is resting on balls 17, whether said balls 17 are at their minimum or their maximum distance apart.

The offset tubular extension of the wall 26 of the bearing base 10 forms the collar 27 which is of sufficient height as to engage with the inner edges of the bearing shoes 19 to restrain them from rotating about the axis of their pivot balls 22. A gap of the order of .01 of an inch is provided between the said inner edges and the outer periphery of the collar 27 to permit freedom of movement between the two surfaces.

The bearing shoes preferably increase in width radially from the leading edge at 21 towards the trailing edge 28, but in an irregular shape as before described. The chamfer 21 permits the bearing shoe to pick up lubricant for the top surface from the thrust pad 29 against which the shoe surfaces rest. The thrust pad is mounted on the underside of a runner 30 having a bore 31 adapted to receive the shaft whose thrust the bearing is to sustain. In the illustrated embodiment the thrust pad is mounted on the runner 30 by pins or dowels 32.

The composition of the bearing surfaces depends upon the lubricant employed. For example, in a water lubricated bearing, stainless steel is a suitable material for the bearing shoes, and the runner disc 29 may be composed of hard graphite, hard rubber or a ceramic material. Generally, the same type of bearing materials may be used for this bearing as would be suitable for conventional radial or thrust bearings using the same lubricant.

The bearing operates as follows: When the thrust pad or runner 30 begins to turn with regard to the stationary bearing base, a wedge-shaped film of lubricant is built up and maintained upon the surface 20 of the bearing shoes 19. Maintenance of this film is greatly aided by the shape of the bearing shoes, by the chamfered leading edges 21 of the bearing shoes, the tiltable mounting of the bearing shoes on the pivot balls 22 and by the surface area distribution with regard to the tilt axis.

The thrust load which the shaft (not shown) exerts upon the thrust pad 29 of the runner 30 is transmitted to the individual bearing shoes 19 and pivot balls 22, to the balls 17 and thence to the bearing base 10. Under load conditions, the pivot balls 22 each tend to push apart the two balls 17 with which each is in contact, but are limited in doing so by reason of the confinement of the balls 17 within the recess of track 16, and the action of the adjacent balls.

Assuming that one of the bearing shoes sustains a greater load than the others, it is depressed to a greater extent. The depressing force acts on its pivot ball 22 which, in turn, tends to increase the gap 18 beneath it, thereby reducing the corresponding gaps 18 of remote balls 17. The balls 17 adjacent those being forced apart, are squeezed closer together, causing the pivot balls 22 in contact with the said adjacent balls to rise, thereby assuming more of the thrust load and relieving the bearing shoe which sustained more than its proper share. The previously overloaded bearing shoe tends to be relieved of its excess load and a condition of equilibrium is established in which all the bearing shoes sustain substantially equal loads. No action on a single shoe can take place without having an influence upon the adjacent shoes and, to some extent, all of the other shoes, and this may take place simultaneously in several different locations. That is why this individual self-adjusting action, inevitably, immediately and continuously takes place to make a perfect bearing surface automatically. The same action takes place if the bearing shoes wear unevenly, or if they are of slightly different thickness initially.

Self-adjustment of the bearing takes place automatically as soon as thrust load is taken by the bearing. During continuous operation of the bearing further adjustment takes place automatically whenever the thrust load is not evenly distributed over all the bearing shoes.

Thus, complete self-equalization of the thrust load is attained in a simple and effective manner. The shape of the bearing shoes insures adequate and even lubrication. Assuming, for example, that there is a tendency of the trailing edge of a bearing shoe to tilt away from the runner disc 29, the pressure within the film of lubricant on the trailing portion of the surface 20 is partly dissipated, so that the ratio of the total pressures on the leading and trailing portions of the bearing shoe is disturbed. The trailing edge will then move towards the runner disc 29 until a condition of equilibrium is once again established.

In another embodiment of the invention as applied to disc-type brakes, the thrust pad 29 is of friction material such as asbestos metal woven cloth and the surfaces 20 of the shoes 19 are of abrasion resistant material such as hardened steel.

The sub-base 12 is capable of axial movement by suitable mechanical means in such a manner that the complete assembly of shoes, together with the base 10, may be withdrawn from contact with the friction pad 29 when the runner 30 is required to rotate freely, and may be urged towards the friction pad 29 so as to apply pressure between the contacting surfaces 20 of the shoes 19 and the friction pad when it is desired to restrain the rotations of the runner 30.

In a further embodiment of the invention as applied to power transmission clutches the same arrangement is used as last described for disc-type brakes, but, in addition, the sub-base 12 is mounted on the shaft to which it is desired to transmit the rotary motion of the runner 30 or vice versa.

I claim:

1. A self-equalizing thrust device comprising, in combination, a rotatable thrust pad, a plurality of thrust shoes of irregular quadrilateral shape contacting said thrust pad, a base having an annular recess therein, a plurality of equalizing balls in said recess with freedom of adjustment of the spacing between adjacent balls, a plurality of substantially evenly spaced pivot balls, one secured to each thrust shoe, each of said pivot balls resting on two equalizing balls in said recess tending, under load, to force the two balls apart, each of said pivot balls supporting a thrust shoe with freedom to tilt relatively to said base, and continuous means for restraining said thrust shoes from rotating about the axis of said pivot balls parallel to the axis of rotation of said thrust pad.

2. A self-equalizing thrust device comprising in combination, a rotatable thrust pad, a plurality of equally spaced thrust shoes of irregular quadrilateral shape having one surface bearing against said thrust pad, a base having an annular recess therein, a plurality of equalizing rolling elements in said recess with freedom of adjustment of the spacing between adjacent elements, hemispherical pivot balls with stems secured to the nonbearing surface of each of said thrust shoes, said pivot balls being supported by two equalizing elements in a said recess tending, under load, to force the two elements apart, continuous means for restraining said thrust shoes from rotating about the axis of said pivot balls parallel to the axis of rotation of said thrust pad, and means engaging said pivot ball stems providing limited radial, circumferential and universal movements for said pivot balls and attached thrust shoes.

3. A self-equalizing thrust device comprising in combination, a rotatable thrust pad, a plurality of equally spaced thrust shoes of irregular quadrilateral shape with one surface having a chamfered leading edge engaging said thrust pad, a base having an annular recess therein, a plurality of equalizing balls in said recess with freedom of adjustment of the spacing between adjacent balls, a hemispherical pivot ball with a stem on its flat surface secured to the nonbearing surface of each of said thrust shoes, said pivot balls being supported by two equalizing balls in said recess tending, under load, to force the two balls apart, and a retainer ring having elongated apertures for engaging and retaining said stems with individual freedom of limited universal movement of the shoes relatively to said base.

4. A self-equalizing thrust device comprising in combination, a rotatable thrust pad, a plurality of equally spaced thrust shoes of irregular quadrilateral shape with one surface having a chamfered leading edge engaging said thrust pad, a base having an annular recess therein, a plurality of equalizing rolling elements in said recess with freedom of adjustment of the spacing between adjacent elements, a hemispherical pivot ball with a stem on its flat surface secured to the nonbearing surface of each of said thrust shoes, said pivot balls being supported by two equalizing elements in said recess tending, under load, to force the two elements apart, and a retainer ring having elongated apertures for engaging and retaining said stems with individual freedom of limited universal movement of the shoes relatively to said base.

5. A self-equalizing thrust device comprising in combination, a rotatable thrust pad, a plurality of equally spaced thrust shoes of irregular quadrilateral shape in contact with said thrust pad, each of said thrust shoes having an integral pivot ball, a base, an annular ball race on said base including means for retaining balls in said race against radial inward and radial outward movement, a plurality of balls on said race spaced with slight clearance between the same, each of said pivot balls being supported for adjustable movement by a pair of said balls, means for maintaining said thrust shoes in equidistant relationship while permitting self-adjusting movement in response to pressure of the said thrust pad, and continuous means for restraining said thrust shoes from rotating about the axis of said pivot balls parallel to the axis of rotation of said thrust pad.

6. A self-equalizing thrust bearing comprising in combination, a rotatable thrust pad, a plurality of equally spaced thrust shoes of irregular quadrilateral shape in contact with said thrust pad, each of said thrust shoes having a neck and a pivot ball head in the form of a hemisphere, an annular track on said base, a plurality of movable elements on said track having freedom of movement along said track and spaced with slight clearance between the same, each of said pivot ball heads being supported for individual adjustable movement by a pair of said movable elements, means engaging the neck of said thrust shoes to maintain them in equidistant relationship while permitting individual adjustment of the said thrust shoes in response to the pressure of the thrust pad, and continuous means for restraining said thrust shoes from rotating about the axis of said pivot balls parallel to the axis of rotation of said thrust pad.

References Cited in the file of this patent

UNITED STATES PATENTS

| | | |
|---|---|---|
| 1,396,880 | Roberton | Nov. 15, 1921 |
| 1,412,341 | Dearborn | Apr. 11, 1922 |
| 2,779,637 | Schaefer | Jan. 29, 1952 |